(12) United States Patent
Nelson et al.

(10) Patent No.: US 8,223,373 B2
(45) Date of Patent: Jul. 17, 2012

(54) IMAGE EDITING PIPELINES FOR AUTOMATIC EDITING AND PRINTING OF ONLINE IMAGES

(75) Inventors: Steve Nelson, San Jose, CA (US); Sean Miceli, San Jose, CA (US); Victor Ivashin, Danville, CA (US)

(73) Assignee: Seiko Epson Corporation, Tokyo (JP)

( * ) Notice: Subject to any disclaimer, the term of this patent is extended or adjusted under 35 U.S.C. 154(b) by 781 days.

(21) Appl. No.: 12/408,531

(22) Filed: Mar. 20, 2009

(65) Prior Publication Data

US 2010/0238483 A1   Sep. 23, 2010

(51) Int. Cl.
*G06F 15/00* (2006.01)
*G06F 3/12* (2006.01)
*G06K 1/00* (2006.01)

(52) U.S. Cl. ...................................... 358/1.15; 358/1.13
(58) Field of Classification Search .................. None
See application file for complete search history.

(56) References Cited

U.S. PATENT DOCUMENTS

| | | | |
|---|---|---|---|
| 6,453,361 B1 | 9/2002 | Morris | |
| 6,727,973 B2 | 4/2004 | Mizumo | |
| 6,914,694 B1 | 7/2005 | Ichikawa et al. | |
| 7,345,780 B2 * | 3/2008 | Seto | 358/1.15 |
| 7,392,284 B2 | 6/2008 | Anderson | |
| 7,760,377 B2 * | 7/2010 | Hirabayashi | 358/1.15 |
| 2003/0043274 A1 | 3/2003 | Gentile | |

FOREIGN PATENT DOCUMENTS

KR   10-2005-0024486   3/2005

* cited by examiner

*Primary Examiner* — Douglas Tran

(57) ABSTRACT

A method having corresponding apparatus and computer-readable media embodying instructions executable by a computer to perform the method comprises: in response to a request to print an image stored on a first website, automatically downloading an image editing pipeline for the image from a second website in response to the request, wherein the image editing pipeline describes one or more image editing operations for the image; automatically downloading the image from the first website; automatically generating an edited image based on the image and the image editing pipeline; and automatically printing the edited image on a printer.

20 Claims, 6 Drawing Sheets

IMAGE EDITING PIPELINES FOR AUTOMATIC EDITING AND PRINTING OF ONLINE IMAGES

BACKGROUND

The present disclosure relates to editing and printing online images such as digital photographs made available through commercial web sites.

Many popular web sites allow users to upload photographs to share with friends and family. Originally the photo-sharing sites were standalone in that photo sharing was the only feature offered. Now photo sharing has been added to social networking sites so users do not have to leave the sites to share photographs. In both standalone and social network photo sharing, printing the photos has been an afterthought. The primary focus of such sites is to view photographs on a monitor without printing them. Thus while high-resolution images may be available for viewing, there is no capability to edit or enhance the images for printing.

Low-cost, high-quality consumer printers that allow users to easily print photographs at home are readily available. However, the traditional printing tools sometimes bundled with printers do not work well in a web environment. The workflow becomes quite tedious with the need to download the appropriate image file from a web site to a local disk, edit the file, and print the file locally. Each person wishing to print the same photograph from the web must repeat the same steps as there is currently no way to leverage the work of others.

One approach is to create yet another photo-sharing web site to address these problems. However, many users are already familiar with the photo sharing capabilities of the popular web sites they currently use, and so would be unlikely to switch to a different site.

SUMMARY

In general, in one aspect, an embodiment features a method and computer-readable media embodying instructions executable by a computer to perform the method, where the method comprises: in response to a request to print an image stored on a first website, automatically downloading an image editing pipeline for the image from a second website in response to the request, wherein the image editing pipeline describes one or more image editing operations for the image; automatically downloading the image from the first website; automatically generating an edited image based on the image and the image editing pipeline; and automatically printing the edited image on a printer.

Embodiments of the computer-readable media can include one or more of the following features. In some embodiments, the method further comprises: displaying the image and a print icon for the image; and automatically downloading the image from the first website in response to user activation of the print icon. In some embodiments, the method further comprises: displaying a list of the image editing operations and a preview of the edited image. In some embodiments, the method further comprises: displaying a print button; and generating the request to print the image in response to user activation of the print button. In some embodiments, the method further comprises: generating a further image editing pipeline in response to user modification of the image editing operations. In some embodiments, the method further comprises: generating the image editing pipeline in response to user input. In some embodiments, the method further comprises: displaying an edit button for the image on a display, wherein user activation of the edit button causes the apparatus to download editor module from the second website, wherein the editor module automatically downloads the image from the first website. In some embodiments, the method further comprises: storing descriptions of the editing operations in the image editing pipeline. In some embodiments, the method further comprises: announcing the existence of the image editing pipeline on a web feed. In some embodiments, the image is a frame of a movie stored on the first website.

In general, in one aspect, an embodiment features an apparatus comprising: an input module adapted to receive a request to print an image stored on a first website; a network module adapted to automatically download an image editing pipeline for the image from a second website in response to the request, wherein the image editing pipeline describes one or more image editing operations for the image; and a pipeline module comprising an auto-download module adapted to automatically download the image from the first website, an auto-edit module adapted to automatically generate an edited image based on the image and the image editing pipeline, and an auto-print module adapted to automatically print the edited image on a printer.

Embodiments of the apparatus can include one or more of the following features. Some embodiments comprise a display module adapted to display the image and a print icon for the image; wherein the auto-download module is further adapted to automatically download the image from the first website in response to user activation of the print icon. In some embodiments, the display module is further adapted to display a list of the image editing operations and a preview of the edited image. In some embodiments, the display module is further adapted to display a print button; and the request to print the image is generated in response to user activation of the print button. In some embodiments, the pipeline module further comprises: an editor module adapted to generate a further image editing pipeline in response to user modification of the image editing operations. In some embodiments, the pipeline module further comprises: an editor module adapted to generate the image editing pipeline in response to user input. Some embodiments comprise a display module adapted to display an edit button for the image on a display, wherein user activation of the edit button causes the apparatus to download the editor module from the second website, wherein the editor module automatically downloads the image from the first website. In some embodiments, the editor module is further adapted to store descriptions of the editing operations in the image editing pipeline. Some embodiments comprise a web feed module adapted to announce the existence of the image editing pipeline on a web feed. In some embodiments, the image is a frame of a movie stored on the first website.

The details of one or more implementations are set forth in the accompanying drawings and the description below. Other features will be apparent from the description and drawings, and from the claims.

Figure 1:
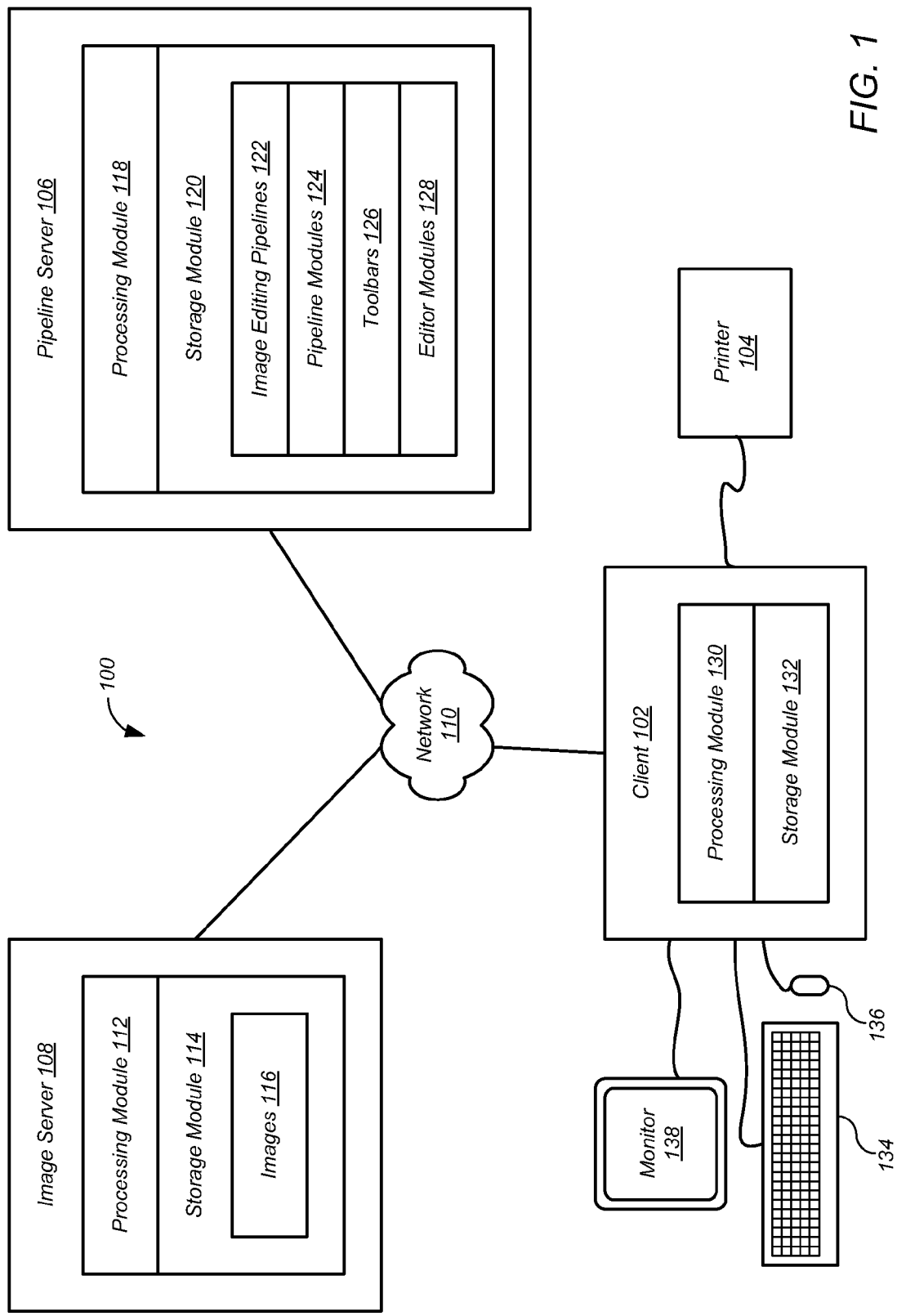
FIG. 1 is an overview of a system for automatic editing and printing of online images using image editing pipelines according to one embodiment.

The leading digit(s) of each reference numeral used in this specification indicates the number of the drawing in which the reference numeral first appears.

DETAILED DESCRIPTION

As mentioned above, digital photographs are commonly shared online using commercial photo-sharing websites. These websites can also be used to edit shared photos. The user can select a photo, edit the photo online, and then download the edited photo for printing on a local printer. However, this process cannot be shared with other users. Instead, other users wishing to print the edited photo must repeat all of the editing operations.

According to embodiments of the present invention, the sequence of editing operations performed by a first user upon an online image are stored on a separate website as an image editing pipeline. When a second user issues a request to print the online image as edited by the first user, the image editing pipeline is automatically retrieved from the separate website, along with a suitable print engine. The retrieved print engine then automatically edits the online image according to the retrieved image editing pipeline, and prints the edited image on a local printer. It is not necessary to store the images on the separate website, thereby eliminating the need to replicate the massive storage servers necessary to host a photo-sharing web site.

FIG. 1 is an overview of a system 100 for automatic editing and printing of online images using image editing pipelines according to one embodiment. Although in the described embodiments, the elements of system 100 are presented in one arrangement, other embodiments may feature other arrangements, as will be apparent to one skilled in the relevant arts based on the disclosure and teachings provided herein. For example, the elements of system 100 can be implemented in hardware, software, or combinations thereof.

Referring to FIG. 1, system 100 includes a client 102, printer 104, a pipeline server 106, and an image server 108. As used herein, the terms "client" and "server" generally refer to an electronic device or module, and the term "module" refers to hardware, software, or any combination thereof. These terms are used to simplify the description that follows. The clients, servers, and modules described herein can be implemented on any standard general-purpose computer, or can be implemented as specialized devices.

Client 102, pipeline server 106, and image server 108 communicate over a network 110. Network 110 can be implemented as a wide-area network such as the Internet, a local-area network (LAN), or the like. However, while some embodiments are described with respect to network communications, they are equally applicable to devices employing other forms of data communications such as direct links and the like.

Image server 108 stores images 116, and serves (that is, delivers) images 116 over network 110. Images 116 can include photographs, frames of video, and the like.

Image server 108 can be implemented as a web server. In such implementations, images 116 can be served using web pages in response to requests such as http requests. Image server 108 includes a storage module 114 to store images 116 and a processing module 112 to serve images 116. As used herein, the term "storage module" refers to hard drives, memories, combinations thereof, and the like. Image server 108 can be implemented as part of a photograph-sharing website, video-sharing website, or the like.

Pipeline server 106 stores image editing pipelines 122 and pipeline modules 124, and serves image editing pipelines 122 and pipeline modules 124 over network 110. Pipeline server 106 can be implemented as a web server. In such implementations, image editing pipelines 122 and pipeline modules 124 can be served using web pages in response to requests such as http requests. Pipeline server 106 includes a storage module 120 to store image editing pipelines 122 and pipeline modules 124, and a processing module 118 to serve image editing pipelines 122 and pipeline modules 124. Storage module 120 can also store other elements, such as toolbars 126, editor modules 128, and the like, which can also be served by processing module 118 over network 110.

Client 102 obtains images 116 from image server 108, for example based on user input. Client 102 also automatically obtains image editing pipelines 122, pipeline modules 124, and other elements from pipeline server 106, and automatically prints images 116 on printer 104. Client 102 includes a processing module 130 and a storage module 132. Client 102 can be controlled by a user with input devices such as a keyboard 134 and a mouse 136, and can generate displays on a display device such as a monitor 138.

Figure 2:
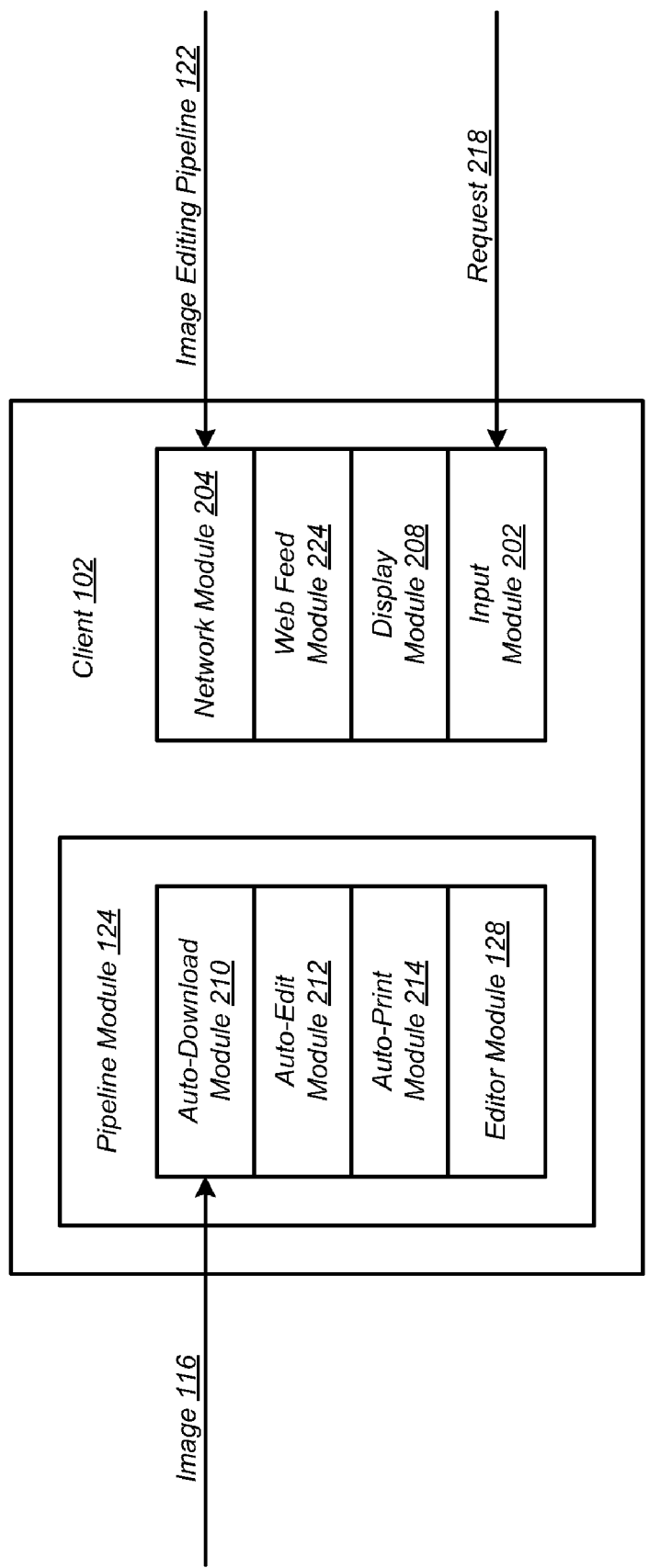
FIG. 2 is functional block diagram of the client of FIG. 1 according to one embodiment.

FIG. 2 is functional block diagram of client 102 of FIG. 1 according to one embodiment. Although in the described embodiments, the elements of client 102 are presented in one arrangement, other embodiments may feature other arrangements, as will be apparent to one skilled in the relevant arts based on the disclosure and teachings provided herein. For example, the elements of client 102 can be implemented in hardware, software, or combinations thereof.

Referring to FIG. 2, client 102 includes an input module 202, a network module 204, a pipeline module 124, and a display module 208. Pipeline module 124 includes an auto-download module 210, an auto-edit module 212, an auto-print module 214, and an editor module 128. During operation, input module 202 receives an image request 218 from a user, auto-download module 210 downloads an image 116 from image server 108 (FIG. 1), and network module 204 downloads an image editing pipeline 122 from pipeline server 106 (FIG. 1), as described in detail below. Image editing pipeline 122 describes one or more image editing operations for image 116. Image editing pipeline 122 can also include meta-data describing the location of image 116, attributes of image 116, and the like. In some embodiments, client 102 also includes a web feed module 224.

Figure 3:
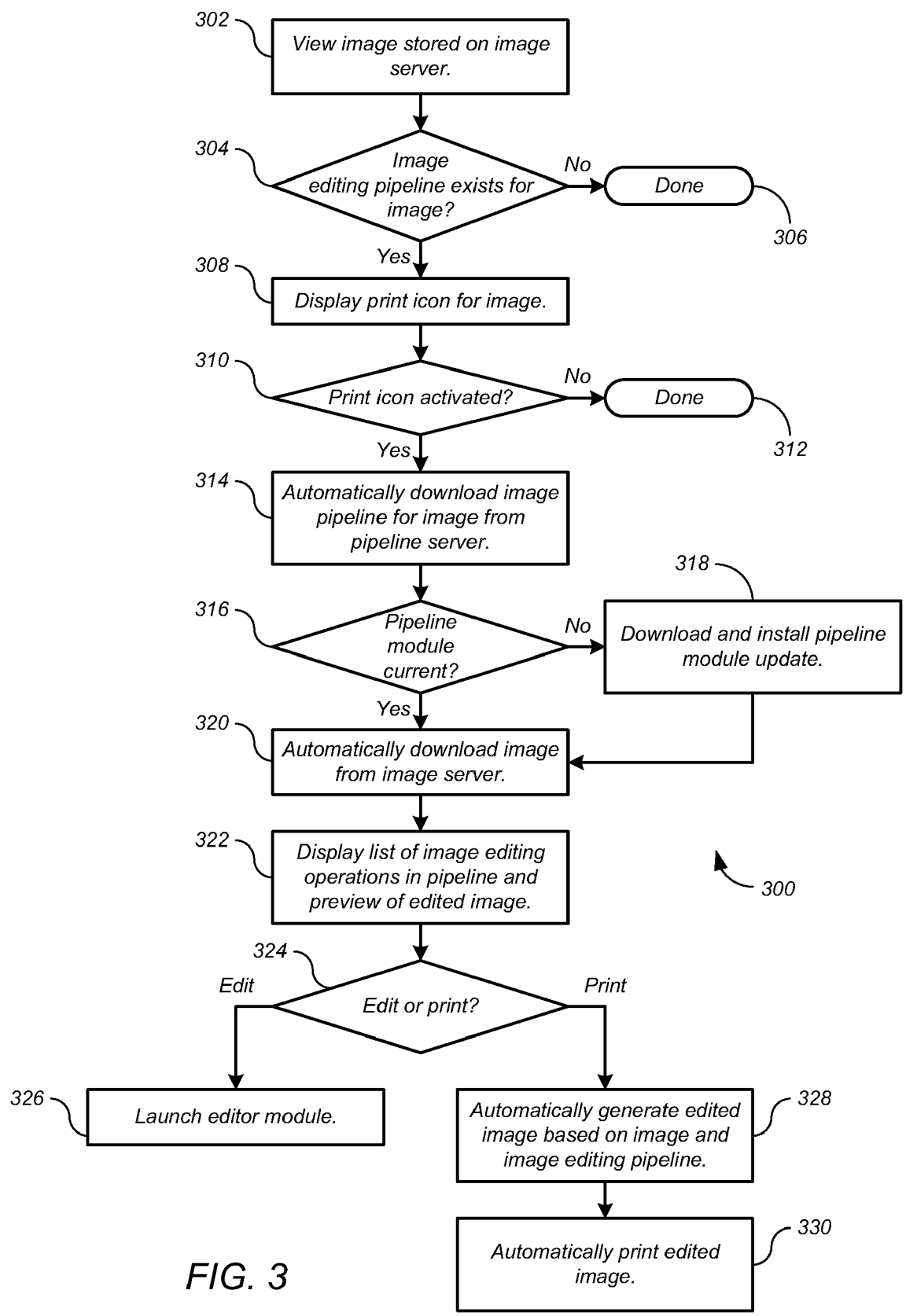
FIG. 3 shows a process where the client of FIGS. 1 and 2 employs an image editing pipeline according to one embodiment.

FIG. 3 shows a process 300 where client 102 of FIGS. 1 and 2 employs an image editing pipeline 122 according to one embodiment. Although in the described embodiments, the elements of process 300 are presented in one arrangement, other embodiments may feature other arrangements, as will be apparent to one skilled in the relevant arts based on the disclosure and teachings provided herein. For example, in various embodiments, some or all of the steps of process 300 can be executed in a different order, concurrently, and the like.

Referring to FIG. 3, a user employs client 102 to view an image 116 stored on image server 108 (step 302). For example, the user employs a web browser executing on client 102 to download a web page that includes a photo from a photo-sharing website. Display module 208 displays the web page, including image 116. In most cases, image 116 is a low-resolution version suitable for viewing, but with insufficient resolution for printing.

Pipeline module 124 determines whether any image editing pipelines 122 exist for image 116, that is, whether any image editing pipelines 122 are stored for image 116 on pipeline server 106 (step 304). For example, a browser toolbar 126 implementing functions of pipeline module 124 queries pipeline server 106 with metadata from the downloaded web page, including the URL of the web page, and including other parameters as needed.

If no image editing pipelines 122 for image 116 are stored on pipeline server 106, then process 300 is done (step 306). However, at this point the user can create a new image editing pipeline 122 for image 116, for example as described below with reference to FIG. 6.

Figure 4:
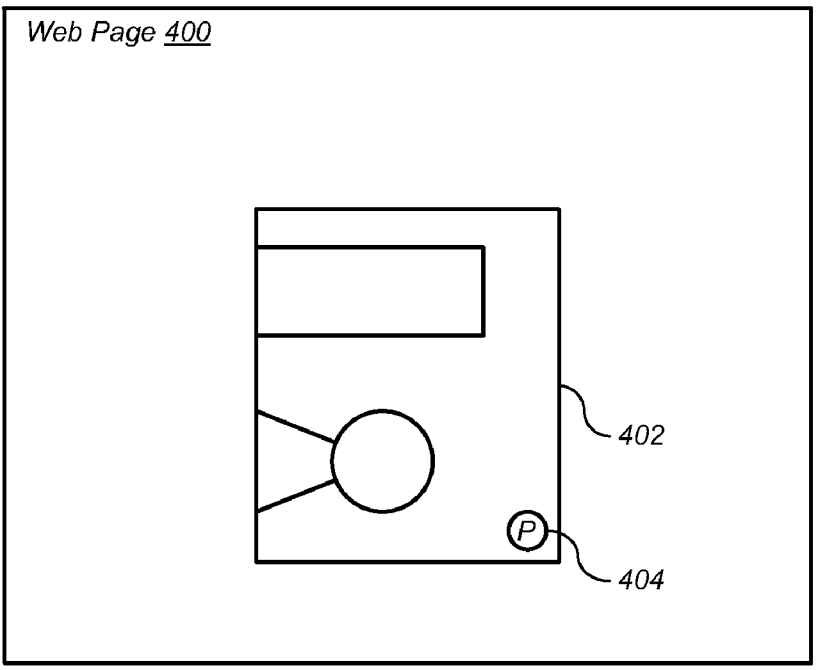
FIG. 4 shows an example web page that includes an example image with a print icon placed in the corner of the image.

Returning to FIG. 3, if an image editing pipeline 122 for image 116 exists, then display module 208 displays a print icon for image 116 (step 308). For example, display module 208 can display a small print icon in the corner of each image 116 in the web page for which an image editing pipeline 122 is stored on pipeline server 106. FIG. 4 shows an example web page 400 that includes an example image 402 with a print icon 404 placed in the corner of the image 402. These small icons 404 alert the user that the image can be printed with pre-existing editing instructions. Returning to FIG. 3, if the user does not activate the print icon 404 (step 310), then process 300 is done (step 312).

But when a user activates the print icon 404 (for example by clicking icon 404 using a mouse 136) for an image 116 (step 310), auto-download module 210 responds by automatically downloading the image editing pipeline 122 for the image 116 from pipeline server 106 to client 102 (step 314). Client 102 can store the image editing pipeline 122 on storage module 132 (FIG. 1).

When multiple image editing pipelines 122 exist for a single image 116, pipeline server 106 keeps statistics of the number of images 116 printed with each pipeline 122. When a user accesses an image editing pipeline 122 for an image 116, pipeline server 106 provides a list of image editing pipelines 122 available for that image 116, ordered by popularity, which can be displayed by display module 208 of client 102. A descriptive name can be added for each image editing pipeline 122 to allow users to easily select an image editing pipeline 122. For example, pipeline server 106 can create text-based descriptions summarizing the major editing steps for each pipeline 122.

In some embodiments, pipeline module 124 has the ability to update itself. For example, pipeline module 124 can query pipeline server 106 to determine whether an update exists (step 316). If so, pipeline module 124 can download and install the update before proceeding (step 318).

Auto-download module 210 then automatically downloads image 116 from image server 108 to client 102 (step 320). As mentioned above, many photo-sharing websites store multiple versions of each image 116 at different resolutions. Low-resolution versions are used for display, and are generally linked to high-resolution versions for editing and printing. Pipeline server 106 can maintain a database of photo-sharing websites on storage module 120 that describes the arrangement of these links and other such information. Auto-download module 210 follows these links to obtain the highest-resolution version available for image 116. Client 102 can store the high-resolution version of image 116 on storage module 132.

Figure 5:
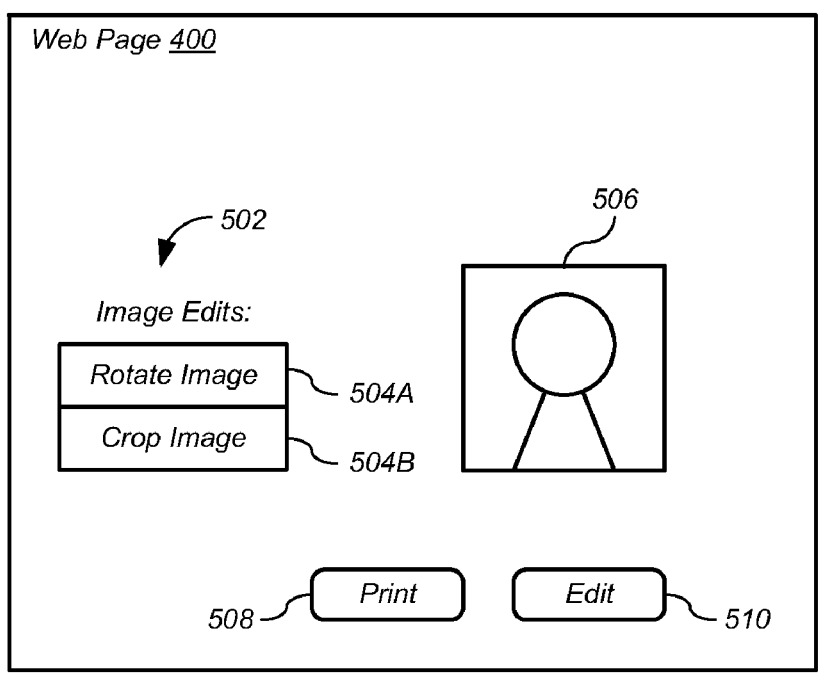
FIG. 5 shows an example list of image editing operations for the image of FIG. 4, as well as an example preview of the image as edited according to the editing operations.

After image 116 and image editing pipeline 122 are downloaded, display module 208 displays the list of the image editing operations in image editing pipeline 122, as well as a preview of the edited image (step 322). FIG. 5 shows an example list 502 of image editing operations 504A,B for image 402 of FIG. 4, as well as an example preview 506 of image 402 as edited according to editing operations 504. Referring to FIG. 5, image 402 has been rotated (editing operation 504A) and cropped (editing operation 504B), as shown in preview 506. Display module 208 also displays a print button 508, which allows the user to print image 402 as edited by image editing pipeline 122 and shown in preview 506, and an edit button 510, which allows the user to edit image editing pipeline 122 by modifying the list 502 of editing operations, thereby creating a new image editing pipeline 122.

Referring again to FIG. 3, if the user elects to edit image editing pipeline 122 (step 324), client 102 launches editor module 128 (step 326), as described below in detail with reference to FIG. 6. Alternatively, if the user elects to print image 116 (step 324), then auto-edit module 212 automatically generates an edited image based on the image 116 and image editing pipeline 122 (step 328). That is, auto-edit module 212 automatically applies the editing operations in image editing pipeline 122 to image 116, thereby automatically generating the edited image. After the edited image is generated, auto-print module 214 automatically prints the edited image on printer 104 (step 330).

As mentioned above, in some embodiments the user is allowed to edit and create image editing pipelines 122. FIG. 6 shows a process 600 where client 102 of FIGS. 1 and 2 creates or edits an image editing pipeline 122 according to one embodiment. Although in the described embodiments, the elements of process 600 are presented in one arrangement, other embodiments may feature other arrangements, as will be apparent to one skilled in the relevant arts based on the disclosure and teachings provided herein. For example, in various embodiments, some or all of the steps of process 600 can be executed in a different order, concurrently, and the like.

Figure 6:
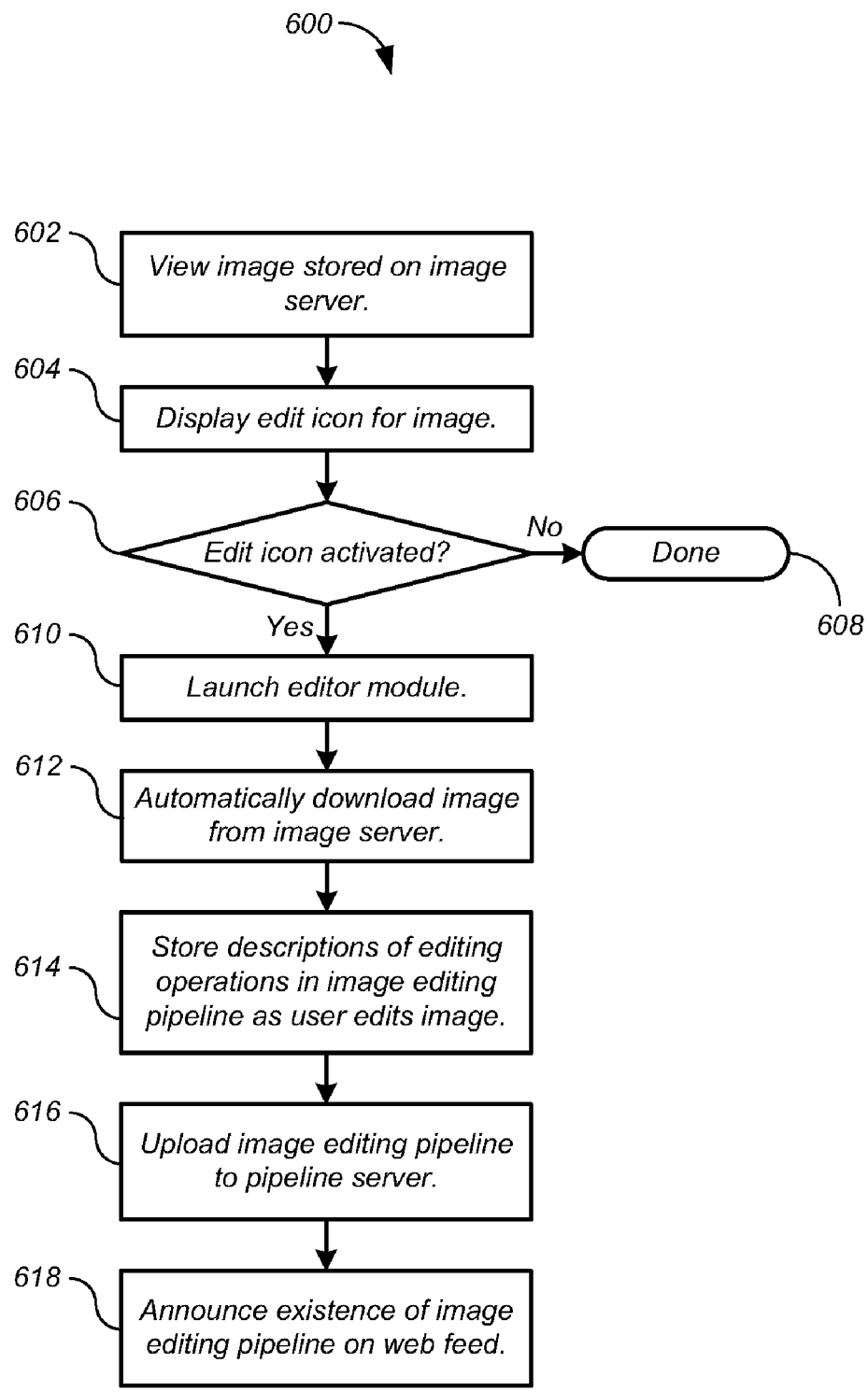
FIG. 6 shows a process where the client of FIGS. 1 and 2 creates or edits an image editing pipeline according to one embodiment.

Referring to FIG. 6, a user employs client 102 to view an image 116 stored on image server 108 (step 602). For example, the user employs a web browser executing on client 102 to download a web page that includes a photo from a photo-sharing website. Display module 208 displays the web page, including image 116. In most cases, image 116 is a low-resolution version suitable for viewing, but with insufficient resolution for printing.

Display module 208 also displays an edit icon for image 116 (step 604). If the user does not activate the edit icon (step 606), then process 600 is done (step 608). But when the user activates the edit icon for an image 116 (step 606), client 102 responds by launching editor module 128 (step 610). If editor module 128 is not installed when the user activates the edit icon, auto-download module 210 automatically downloads editor module 128 to client 102. Editor module 128 can be implemented as a browser plug-in or the like. For example, editor module 128 be developed as an Abode Flash application, a Java applet, an advanced DHTML program, or the like. In any case, editor module 128 preferably works inside the browser, and so does not require the launching of an external program.

Editor module 128 automatically downloads image 116 from image server 108 (step 612). The image 116 downloaded by editor module 128 can be a high-resolution versions of the image 116 shown on a web page. The user employs editor module 128 to edit image 116.

Figure 7:
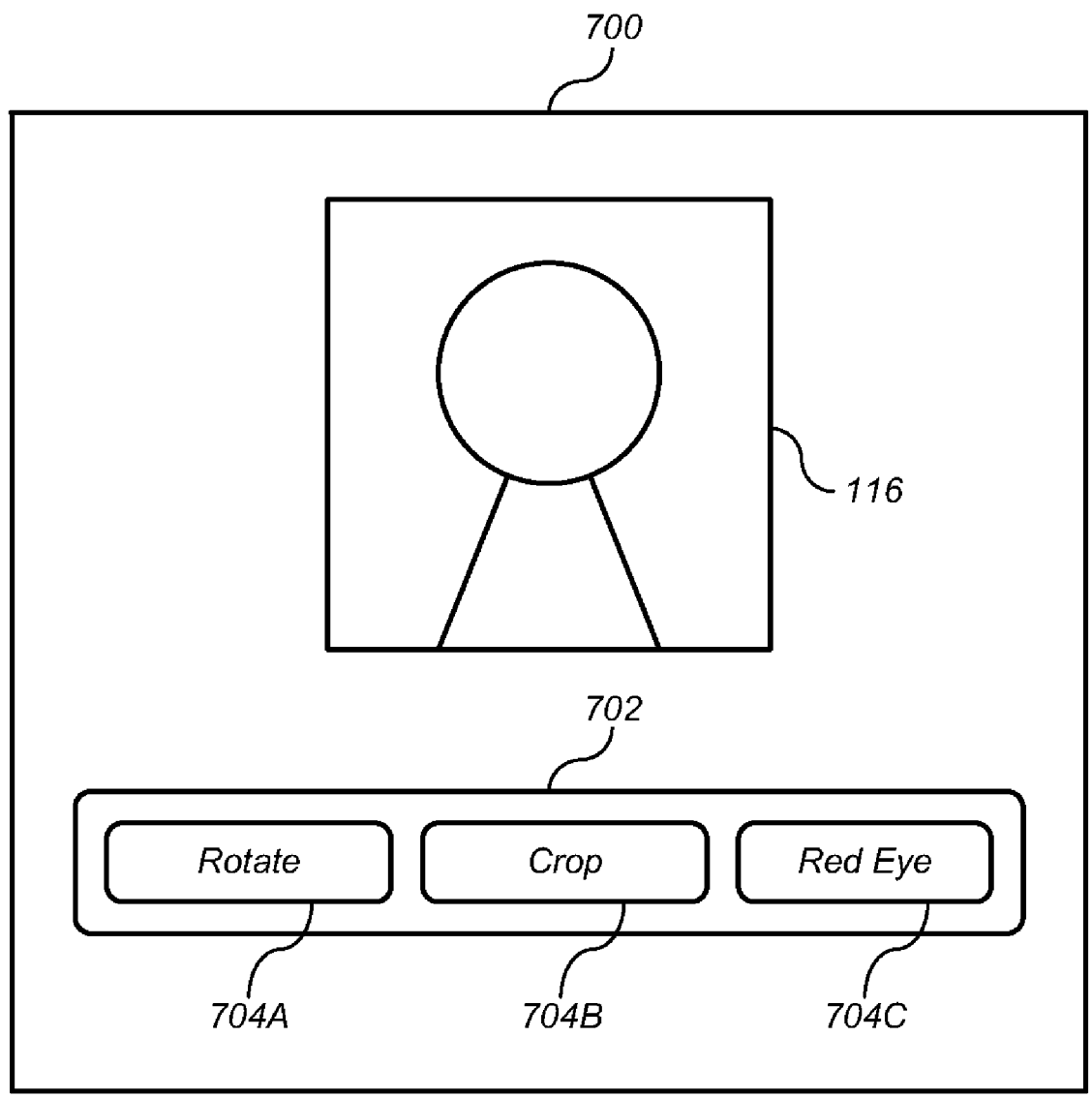
FIG. 7 shows an example display produced for the editor module of FIG. 1.

FIG. 7 shows an example display 700 produced by display module 208 for editor module 128. Display 700 includes image 116 and an editing toolbar 702 that includes buttons 704 for various editing tools including a rotate button 704A, a crop button 704B, a red eye button 704C, and the like. Each of these editing operations works in real time, updating image display 700 so the user can immediately see the effect of the editing operations. As the user edits image 116, editor module 128 stores descriptions of the editing operations in image editing pipeline 122 (step 614). When the user is done editing, editor module 128 uploads image editing pipeline 122 to pipeline server 106 (step 616).

The user is given the option to set the access mode for image editing pipeline 122 as either public or private. If the user selects public access, any user can use image editing pipeline 122. But if the user selects private access, only that user can use image editing pipeline 122. Pipeline server 106 also keeps a record of all images printed by each user, providing quick access if a user wishes to print a photograph again.

In some embodiments, after image editing pipeline 122 is uploaded, web feed module 224 announces the existence of the image editing pipeline 122 on a web feed (step 618). For example, the web feed can be an RSS feed. RSS is an efficient means for distributing information. In the typical configuration, an information producer creates an RSS feed to which information consumers can subscribe. Information consumers can use RSS readers to organize and view the RSS feeds to which they subscribe. The RSS reader polls each subscribed feed at regular intervals to determine whether new information has been provided by the information providers for those feeds. The RSS reader creates a new log entry for each new piece of information.

Users can configure pipeline server 106 as an RSS information provider that distributes information about image editing pipelines 122 as they are created. For example, a parent can create an RSS feed on pipeline server 106 to share family photographs with relatives and friends. When the parent edits a photograph, an image editing pipeline 122 is created and stored on pipeline server 106, for example as described above. In response, the parent's RSS feed provides information about the edited photograph to subscribers. Subscribers to the parent's RSS feed subsequently see a new RSS entry in their RSS readers. The entry contains information about the photograph, along with a preview of the photograph and a print icon. When the subscriber activates the print icon in the RSS reader, the photograph and image editing pipeline 122 are automatically downloaded, and the photograph is edited according to image editing pipeline 122 and printed, as described above.

Various embodiments can be implemented in digital electronic circuitry, or in computer hardware, firmware, software, or in combinations of them. Apparatus can be implemented in a computer program product tangibly embodied in a machine-readable storage module for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage modules for storing data files; such devices include magnetic disks, such as internal hard disks and removable disks; magneto-optical disks; and optical disks. Storage modules suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the spirit and scope of this disclosure. As mentioned above, various embodiments can be used to edit and print frames of video in addition to photographs. In some embodiments, editor module 128 allows the user to view individual frames of a video, edit the content of the frames, and print the frames. Accordingly, other implementations are within the scope of the following claims.

What is claimed is:

1. A non-transitory computer readable medium or media embodying instructions executable by a computer to perform a method comprising:
   in response to a request to print an image stored on a first website, automatically downloading an image editing pipeline for the image from a second website in response to the request, wherein the image editing pipeline describes one or more image editing operations for the image;
   automatically downloading the image from the first website;
   automatically generating an edited image based on the image and the image editing pipeline; and
   automatically printing the edited image on a printer.

2. The non-transitory computer-readable medium or media of claim 1, wherein the method further comprises:
   displaying the image and a print icon for the image; and
   automatically downloading the image from the first website in response to user activation of the print icon.

3. The non-transitory computer-readable medium or media of claim 2, wherein the method further comprises:
   displaying a list of the image editing operations and a preview of the edited image.

4. The non-transitory computer-readable medium or media of claim 3, wherein the method further comprises:
   displaying a print button; and
   generating the request to print the image in response to user activation of the print button.

5. The non-transitory computer-readable medium or media of claim 2, wherein the method further comprises:
   generating a further image editing pipeline in response to user modification of the image editing operations.

6. The non-transitory computer-readable medium or media of claim 1, wherein the method further comprises:
   generating the image editing pipeline in response to user input.

7. The non-transitory computer-readable medium or media of claim 6, wherein the method further comprises:

displaying an edit button for the image on a display, wherein user activation of the edit button causes the apparatus to download editor module from the second website, wherein the editor module automatically downloads the image from the first website.

8. The non-transitory computer-readable medium or media of claim 7, wherein the method further comprises:
storing descriptions of the editing operations in the image editing pipeline.

9. The non-transitory computer-readable medium or media of claim 1, wherein the method further comprises:
announcing the existence of the image editing pipeline on a web feed.

10. The non-transitory computer-readable medium or media of claim 2:
wherein the image is a frame of a movie stored on the first website.

11. An apparatus comprising:
an input module adapted to receive a request to print an image stored on a first website;
a network module adapted to automatically download an image editing pipeline for the image from a second website in response to the request, wherein the image editing pipeline describes one or more image editing operations for the image; and
a pipeline module comprising
an auto-download module adapted to automatically download the image from the first website,
an auto-edit module adapted to automatically generate an edited image based on the image and the image editing pipeline, and
an auto-print module adapted to automatically print the edited image on a printer.

12. The apparatus of claim 11, further comprising:
a display module adapted to display the image and a print icon for the image;
wherein the auto-download module is further adapted to automatically download the image from the first website in response to user activation of the print icon.

13. The apparatus of claim 12:
wherein the display module is further adapted to display a list of the image editing operations and a preview of the edited image.

14. The apparatus of claim 13:
wherein the display module is further adapted to display a print button; and
wherein the request to print the image is generated in response to user activation of the print button.

15. The apparatus of claim 12, wherein the pipeline module further comprises:
an editor module adapted to generate a further image editing pipeline in response to user modification of the image editing operations.

16. The apparatus of claim 11, wherein the pipeline module further comprises:
an editor module adapted to generate the image editing pipeline in response to user input.

17. The apparatus of claim 16, further comprising:
a display module adapted to display an edit button for the image on a display, wherein user activation of the edit button causes the apparatus to download the editor module from the second website, wherein the editor module automatically downloads the image from the first website.

18. The apparatus of claim 17:
wherein the editor module is further adapted to store descriptions of the editing operations in the image editing pipeline.

19. The apparatus of claim 11, further comprising:
a web feed module adapted to announce the existence of the image editing pipeline on a web feed.

20. The apparatus of claim 11:
wherein the image is a frame of a movie stored on the first website.

* * * * *